May 23, 1944.  H. B. CORLEY  2,349,485
STREET TRAFFIC SIGNAL
Filed Nov. 1, 1941  3 Sheets-Sheet 1

Inventor
H. B. Corley, Sr.
Lester L. Sargent
Attorney

May 23, 1944.                H. B. CORLEY                2,349,485
                         STREET TRAFFIC SIGNAL
                          Filed Nov. 1, 1941              3 Sheets-Sheet 2

Inventor
H. B. Corley, Sr.
By Lester L. Sargent
Attorney

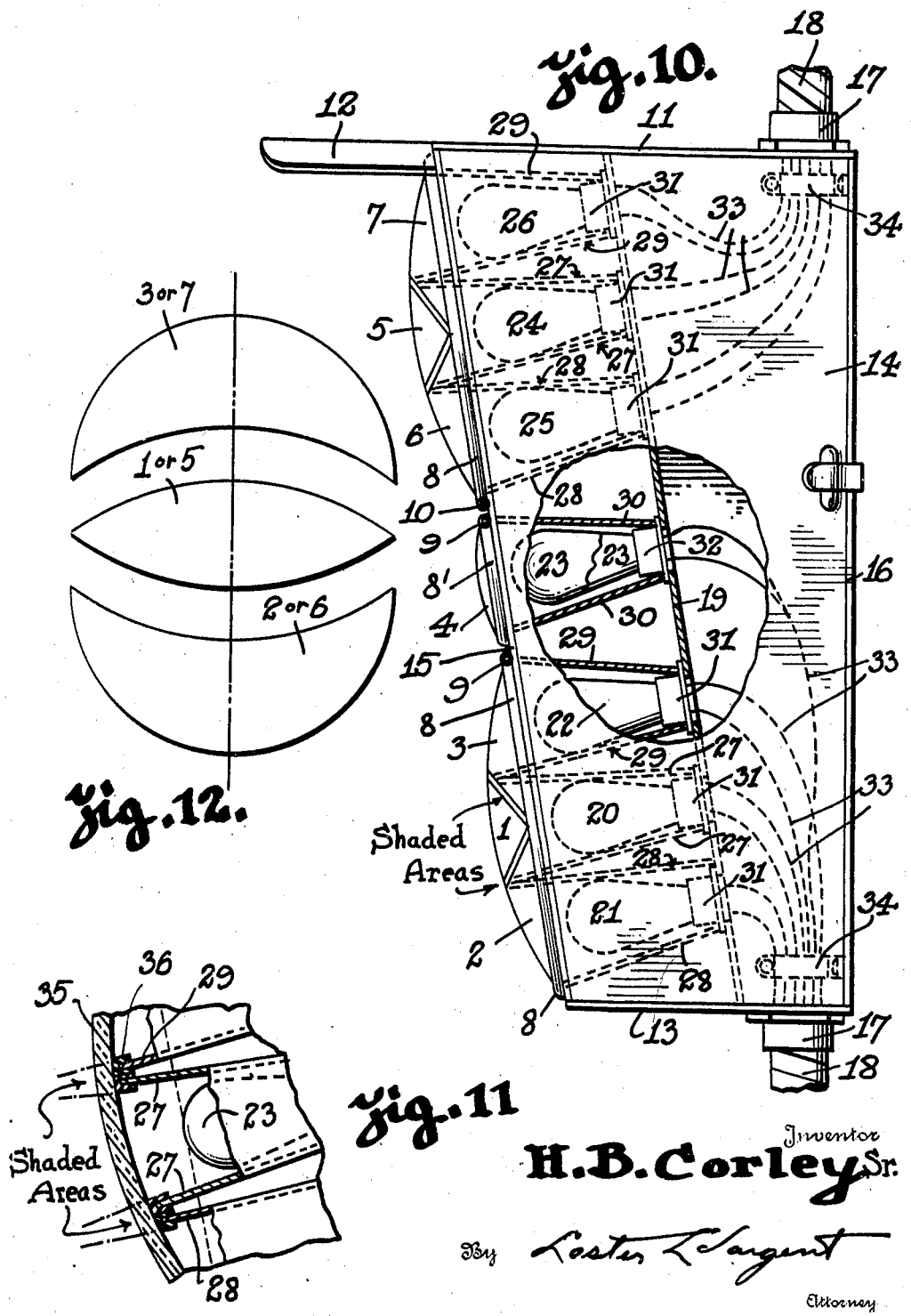

Patented May 23, 1944

2,349,485

UNITED STATES PATENT OFFICE 2,349,485

STREET TRAFFIC SIGNAL

Henry B. Corley, Washington, D. C.

Application November 1, 1941, Serial No. 417,557

3 Claims. (Cl. 177—337)

The object of my invention is to provide a novel street traffic signal in which the red and green lights are each divided into a plurality of sections with corresponding lights arranged to be successively extinguished, whereby traffic will be informed as to about how long the green or red light will be effective before it is extinguished entirely.

It is also an object of my invention to provide a novel form of caution light so that it may be more clearly differentiated from the red and green signal lights by its shape as well as by its color.

It is a further object of my invention to provide a novel type of casing for the signal lights in which both the light bulbs and the lens for the lights are positioned in a downwardly slanting position relative to vertical; and to provide a casing which requires only a short protecting hood and to provide means for mounting the casing on the signal pole.

Another object of my invention is to provide a novel plurality of lenses of the shape shown, and alternatively to provide novel means whereby a single lens may be used and with a series of partition members provided for each red and green light.

I attain these and other objects of my invention by the mechanism illustrated in the accompanying drawings, in which—

Fig. 10 is a side elevation of the traffic signal casing with a portion of the side of the casing broken away to show the interior construction;

Figure 1:
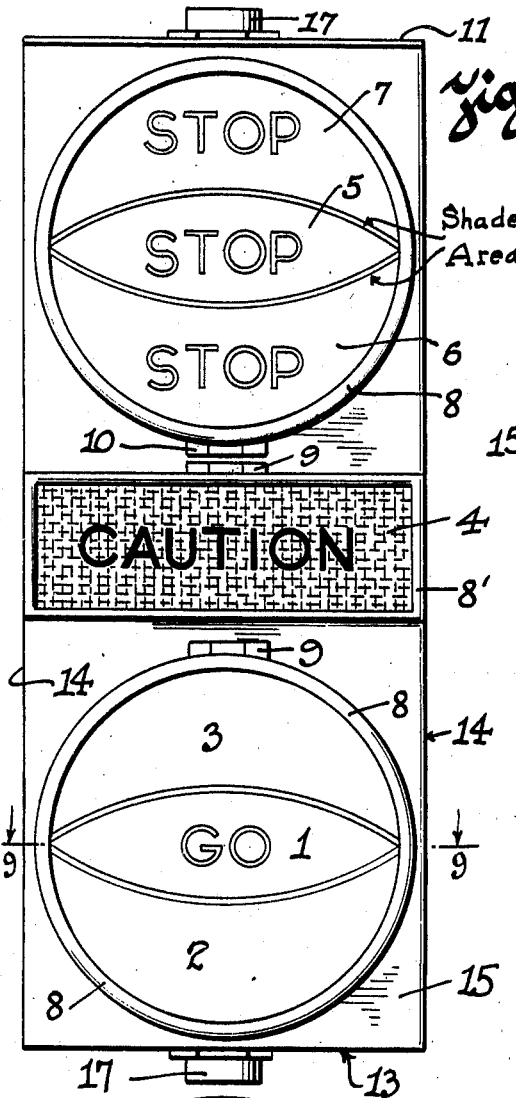
Figure 1 is a front plan view of the complete signal light.
Figure 2:
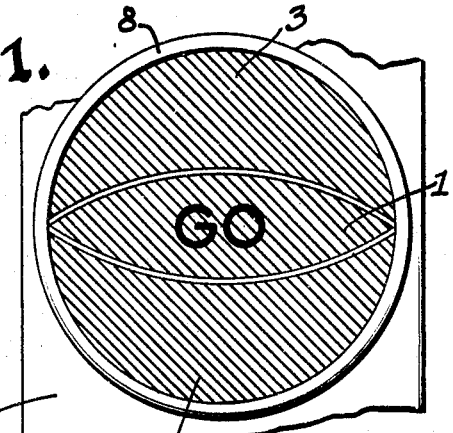
Fig. 2 is a front plan view of the green signal light when all sections are illuminated.
Figure 3:
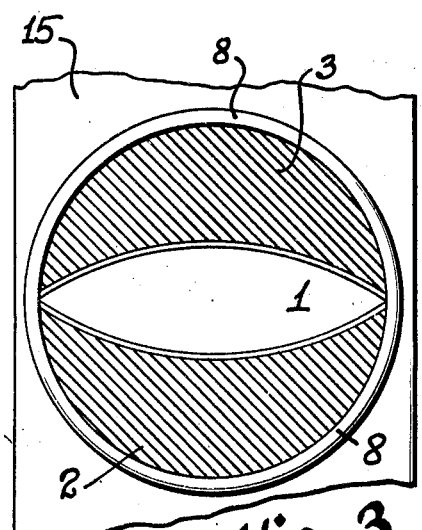
Fig. 3 is a front plan view of the green signal light when two of the sections only are illuminated, as it appears after the green signal has been on a predetermined period of time.
Figure 4:
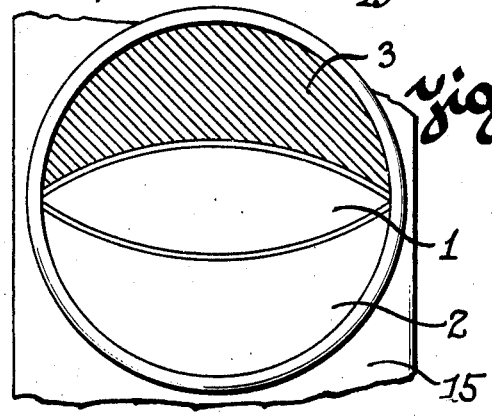
Fig. 4 is a front plan view of the green signal light when only one of the sections is illuminated and indicating that the green signal light will remain on only a short period of time.
Figure 5:
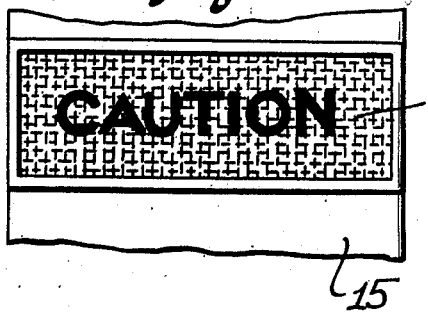
Fig. 5 is a front plan view of the caution light.
Figure 6:
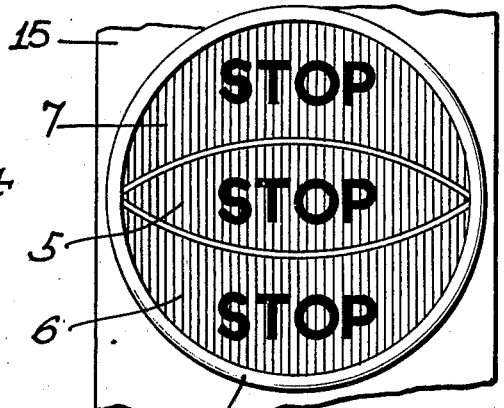
Fig. 6 is a front plan view of the red signal light when all sections are illuminated.
Figure 7:
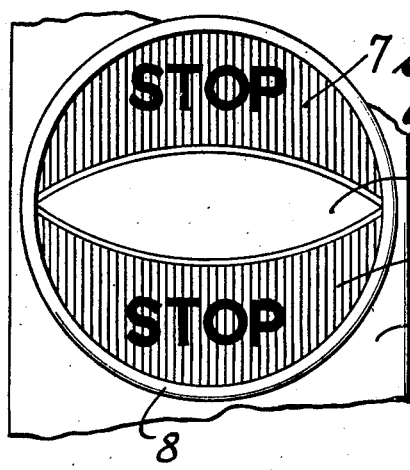
Fig. 7 is a front plan view of the red signal light when the light in the signal section has been extinguished and the two outer sections only are illuminated, indicating that the light has been on a predetermined period of time.
Figure 8:
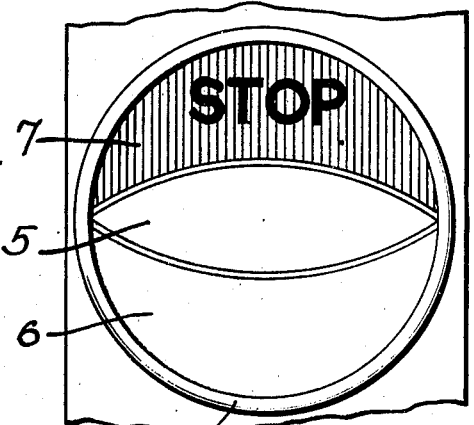
Fig. 8 is a front plan view of the red signal light with only one of the sections illuminated and indicating that the light will remain on only a short period of time.
Figure 9:
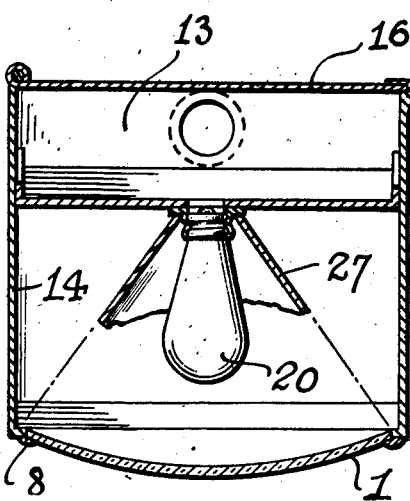
Fig. 9 is a horizontal section on line 9—9 of Figure 1.

Fig. 11 is a detail sectional view of one form of the invention having a single lens for the red and green signal lights and having the ends of the partitions protected by a strip of rubber; and, Fig. 12 is a detail of my preferred form of the invention in which three separate lenses are provided for each of the red and green signal lights, the lenses being spaced apart in this figure merely to more clearly show their shape; in actual use they are arranged as shown in Figs. 1 and 10.

Like numerals designate like parts in each of the several views.

Referring to the accompanying drawings, and especially to Figs. 1 and 10, I provide a central green light lens 1, the opposite edges of which are convex in outline, a lower green light lens, the upper edge of which is concave and the lower edge convex in outline, and an upper green light lens 3, the lower edge of which is concave and the upper edge convex in outline, and which three lenses together form a complete circle.

I provide a central caution light lens which is preferably rectangular in outline to differentiate it by shape as well as by color from the red and green lights, the caution light being yellow.

I provide a central red light lens 5, a lower red light lens 6, and an upper red light lens 7, corresponding in shape with the green light lenses, and which together form a complete circle, as shown.

The group of red lenses and the group of green lenses are mounted in like round frames 8, while the lens of the caution light is mounted in a rectangular frame 8'. The green lens frame and caution lens frame are each hinged at the top by hinges 9; while the red lens frame is hinged at the bottom by means of the hinge 10.

The casing of the signal light, which preferably is of metal, comprises a top wall 11 having a projecting visor 12, a bottom wall 13 of shorter length than the top 11, parallel side walls 14, and a rear wall 16 which is hinged to form a door.

Affixed to the top 11 and bottom 13 are short pipe supports 17 by which the signal light is secured to a suitable support. Electric conduits 18 lead from pipe supports 17 to protect the electric wiring. A novel inner wall 19 functions as a support for the several light bulb sockets and is disposed in a plane parallel to that of the front wall 15.

Behind the green light lenses 1, 2 and 3 are electric light bulbs 20, 21 and 22 respectively. Behind the caution light lens 4 are a pair of electric light bulbs 23. Behind the red light lenses 5, 6 and 7 are electric light bulbs 24, 25 and 26, respectively.

Surrounding the central light bulbs 20 and 24 are outwardly expanding convex reflecting partitions 27. Surrounding the lower green and red light bulbs 21 and 25 are outwardly expanding concavo-convex reflecting partitions 28, while surrounding the upper bulbs 22 and 26 of the green and red lights respectively are outwardly expanding inverted concavo-convex reflecting partition walls 29, the outer edges of which extend to and correspond in outline with the corresponding edges of the respective lenses. Outwardly expanding straight reflecting walls 30 surround the plural bulbs 23 of the caution light.

The electric bulbs of the red and green lights are mounted in sockets 31 and the bulbs of the caution light are mounted in sockets 32 affixed to the inner wall 19, which extends parallel to the front wall of the casing, as shown in Fig. 10. A series of wires 33 lead from the several light bulbs to a suitable source of current. The wires 33 are held in place within the casing by suitable clamps 34 and then proceed through the pipe 17 and conduits 18 to a suitable source of current where conventional switches operate for turning the lights on and off at the desired predetermined time.

Referring to Fig. 11 there is illustrated a modification of the invention in which a single circular lens 35 is provided for each of the red and green lights in lieu of the three lenses for each of said lights shown in Fig. 10. In this form of the invention, I provide rubber strips 36 which protect the lens from the outer edges of the light reflecting walls 27, 28, and 29.

The operation of the signals will be controlled by automatic electric switches located in central control units from which cables or insulated electric wires lead to designated signals over an area of which said electric switch will control. Such electric switches can be regulated as to time to meet local requirements. For example, where four signal boxes are used at an intersection where the signals are timed for sixteen second "Go" and "Stop" signal. Beginning with the green or "Go" signals for the north and south bound traffic and the red or "Stop" signals for the east and west bound traffic. The number 1, 2 and 3 green lights form a set for the north and south bound traffic, and number 5, 6 and 7 red lights as a set for the east and west bound traffic would illuminate simultaneously. The green light 1, and similarly red light 5, when illuminated would remain illuminated for one-half of the allotted time, or eight seconds. During the aforementioned first half of the green or "Go" signal, the local traffic authorities would have the right by placing signs to specify through traffic only during the first half of signal. This would give pedestrians a right of way which they do not enjoy under signals in use at this date.

Electric wiring controlling the bulbs behind number 2 concavo-convex green lens for the north and south bound traffic and the No. 6 red light for the east and west bound traffic keep them illuminated for a period of four additional seconds, which would make their illumination continuous from the beginning of the "Go" signal for twelve seconds. At this point the local traffic authorities would have the right to stop pedestrians from entering the intersection in which they did not have sufficient time to cross before the signals changed, which would be only four seconds. The autoist would be restricted from making right or left turns during the first three quarters or twelve seconds of green light, if their percentage in number was small enough to justify such regulatory measures at a given intersection. This would expedite right or left turns as the motorist would have far less pedestrians to contend with, where pedestrians were prohibited from entering the intersection on the last quarter green light.

Three fourhs of the green light period, or twelve seconds, have elapsed from the sixteen second "Go" at this point for north and south bound traffic, but the number 3 green light, for north and south bound traffic, and number 7 red light for east and west bound traffic, remain illuminated for four additional seconds, thereby completing the unit of control before the caution light is illuminated. The caution light remains illuminated for one second before the illumination of all three green lights for the east and west bound traffic and all three red lights for the north and south bound traffic.

It is obvious that the intersection would be practically free of pedestrians at this point if the restriction of not permitting them to have entered the north and south bound pedestrian lanes on the previous last four seconds of the green or "Go" signal is observed. This would permit the east and west bound traffic to go forward without being interrupted by pedestrians who had entered the intersection as they do with the present day signal lights when the green light with the word "Go" is on and they have entered the intersection but suddenly realize that they are stranded in the path of oncoming traffic which has been given the "Go" signal at a time after the stranded pedestrians had entered the intersection.

My invention will at least partially eliminate such congestions and unrestricted turns by autoists which are the primary traffic problems of the present time.

Should one of the bulbs of wires contacting the red or green light become inoperative the other two would function during their allotted time and this partial signal would be better than no signal at all until repairs could be made.

Where the caution light is equipped with two bulbs and one becomes inoperative the other would continue to flash a decreased illuminated signal until the dead bulb could be replaced. As the caution light bulbs are on a twenty-four day shift, their average life would be less than the bulbs in the green or the red signals, hence a second bulb would partially guarantee a continuous signal until the defective bulb could be replaced. The mounted lenses are hinged to allow their replacement and the replacing of bulbs when required.

The interior cell walls will be chromium plated or aluminum painted to increase their illumination.

I may use double sockets in V-shaped disposition for the caution light and elsewhere if desired.

My invention takes into consideration the interests of the vast majority and to each will be given the right of way during the first half or first three quarters of the green or "Go" light, whereas the motorist would be restricted to make right or left turns only on last half or last quarter of the period of the green or "Go" signal. This will be determined by local traffic authorities by placing signs designating such turns where lights are in operation. When this is accomplished a saving of valuable moments will speed up traffic in congested areas to an appreciable degree.

Each individual light signal in this invention, when illuminated, is large enough to make them easily identified at a reasonable safe distance in city traffic. Their simplicity in design makes them easy for all (and especially children) to understand. Where this signal is to be used on open highways where traffic lights and intersections are few and far between, the size of the signal lenses could be increased from twelve to fifteen or eighteen inches in diameter if desired to make them visible and understandable to approaching traffic for a distance of six hundred or more feet as the speed permitted on open highways makes this essential.

The dimensions of the lenses in this invention when used as railroad block signals could be increased up to twenty-four inches in diameter if desired, as a signal of this size would be visible at a greater distance to the engineer or pilot of a fast moving railway train under all weather conditions than the present smaller signal lights now in use. Be it understood that the green or "Go" signal would operate as a whole signal and the red light would operate on the same principle of dividing the time in minutes as it is devised to operate on seconds in city traffic. It is recalled that some serious accidents have occurred on the railroads in the past few years and it has been admitted or assumed that a majority of these accidents were partially or wholly the fault of the engineer's or pilot's failure to see the warning signals ahead.

This invention opens the way for local traffic authorities to institute a handicap in congested areas, due to the difference in speed of pedestrians and autoists; a handicap is necessary in order to clear the intersection of autoists and pedestrians at approximately the same time. This invention will give the authorities the opportunity of restricting pedestrians from entering intersections in which the "Go" signal has all disappeared but the last quarter signal, if, in the opinion of the traffic authorities, said pedestrians would not have sufficient time to cross and clear the intersection before the traffic signal changed.

This invention can be used at intersections where the signal box is suspended from the middle of the intersection by using four faces, (as in a four-faced clock) and would only necessitate changing the lenses. For instance, the bottom lights would operate green signals for one street and red signals for the other and the top lights would reverse the signals. The caution light would illuminate the usual warning signal for a period between the other signals.

My invention will help to expedite court procedure where collisions or reckless driving is charged at intersections where the signals were illuminated at the time of the accident.

The preferred dimensions of the exterior housing box will be thirty inches high; bottom sides ten inches; front and rear twelve and one-half inches; sides at top will be fifteen inches with front and rear twelve and one-half inches. A door will be placed in the rear to make accessible the rear compartment for wiring, adjustments or repairs. The back will stand in a vertical position at right angles with the top and bottom, thereby causing the front and lenses to lean forward to an angle of 82½° horizontally. A partition 19 is inserted preferably six inches parallel from the front and is fitted with openings for electric light sockets to hold electric light bulbs at right angles to the front lenses. The purpose of the approximately 82½° angle of the front lenses are:

(a) To focus the beam of light more directly towards the pedestrians and autoists or other vehicular traffic crossing or near the intersection as the lights are several feet above them.

(b) To eliminate the banking of snow on ledges which would obscure the signals during or immediately following a heavy snowfall.

(c) To lessen the possibility of breaking lenses during a severe hail storm.

The front wall contains two circular openings preferably twelve inches in diameter at the top and bottom. Each of these two openings contain three cells of preferably equal central vertical dimensions of four inches each for the green lights and red lights. The caution light preferably will be placed about one inch above the green or "Go" light and will form a rectangular lens, preferably four by twelve inches. The reasons for using a rectangular caution lens are:

(a) That it will not be mistaken for the green or red lights on other vehicular traffic such as street cars, foglights or other lights of a similar color.

(b) That the size being similar to a bar will within itself warn the motorist that he is entering an intersection.

(c) That while the timing of the lights can be reduced or lengthened to suit local needs, the timing of the caution light can be reduced to one second flat between the green and red signals, due to the appearance in eclipse of either of the other lights just prior to the operation of the caution light.

The red or "Stop" light, preferably will be placed about one inch above the caution light and the construction will be identical to the green or "Go" light with one exception—the lenses will be red instead of green and the word "Stop" will be painted on each one of the red lenses, as shown in Fig. 1.

What I claim is:

1. In a traffic signal light of the type described, the combination of a casing, a series of three lenses of like color, comprising a central lens having its opposite edges oppositely curved to form an approximate ellipse, an upper lens adjacent the central lens and having both its edges upwardly curved to form a crescent-shaped lens, and a lower lens having both its edges downwardly curved to form a reversely disposed crescent-shaped lens, expanding light-reflecting partitions shaped to have their outward edges contact the respective edges of the aforesaid lenses to form separate light compartments, and separate light bulbs disposed behind each of the aforesaid lenses to permit of successive illumination of the said lenses, whereby time lapse of red and green signals is indicated by the area of illumination of those signals throughout the period of illumination of either of those colored signals.

2. In a traffic signal light of the type described, the combination of a casing, a series of three adjoining lenses for the green light, a similar series of three adjoining lenses for the red light, said lenses for each of the aforesaid lights comprising a central lens having its edges oppositely curved, a lower lens having both its edges downwardly curved to form a crescent, an upper lens having both its edges upwardly curved to form a crescent, expanding light-reflecting partitions having their outer edges terminating at the respective edges of the aforesaid lenses, an electric light bulb disposed behind each of the aforesaid lenses, whereby time lapse of red and green signals is indicated by the area of illumination of those signals throughout the period of illumination of either of those colored signals, a yellow lens to function as a caution light and disposed between the series of red and the series of green lenses, expanding light-reflecting walls extending to said lens, light bulbs mounted within said last-mentioned light-reflecting walls, a casing and supporting partition for the bulbs common to all the lenses, and means for securing the several partitions in the casing.

3. In a traffic signal light of the type described, the combination of a series of three lenses for the green light and three lenses for the red light, each of said series of three contiguous lenses comprising an upper crescent-shaped lens, an intermediate approximately elliptical lens, and a lower reversely disposed crescent-shaped lens, expanding light-reflecting walls extending to the edges of each of said lenses, light bulbs and sockets, one for each lens to permit successive and independent illumination and darkening of the series of lenses for both the green and red lights at predetermined intervals to indicate the time lapse on each group of red and each group of green lenses by the relative area of illumination as compared with the entire area of the group of lenses included in the circle of the red and green lamp signals, an intermediate yellow lens for the caution light, light reflecting walls extending to said lens, said lens and walls being of different shape from the lenses and walls of the green and red lights, whereby to differentiate the caution light from the green and red lights by size and shape as well as by color, a common means for supporting the aforesaid light bulb socket, and a common hinged rear wall for the casing to permit of access to all the light bulb sockets.

HENRY B. CORLEY.